US007073433B2

(12) United States Patent
Burke et al.

(10) Patent No.: US 7,073,433 B2
(45) Date of Patent: Jul. 11, 2006

(54) AUGER DEWATERING SYSTEM

(75) Inventors: James Burke, Hawthorne, CA (US); Robert Sabol, Aliso Viejo, CA (US)

(73) Assignee: JWC Environmental, Santa Ana, CA (US)

( * ) Notice: Subject to any disclaimer, the term of this patent is extended or adjusted under 35 U.S.C. 154(b) by 0 days.

(21) Appl. No.: 10/384,759

(22) Filed: Mar. 11, 2003

(65) Prior Publication Data

US 2004/0178053 A1 Sep. 16, 2004

(51) Int. Cl.
*B30B 9/14* (2006.01)
*B01D 35/00* (2006.01)

(52) U.S. Cl. ....................... 100/117; 100/110; 100/126; 100/127; 100/145; 210/413; 210/415; 210/770

(58) Field of Classification Search ................ 100/104, 100/110, 112, 117, 125, 126, 144, 127, 128, 100/131, 138, 145, 146, 147, 148, 150, 215; 99/495, 458, 465; 210/386, 391, 400, 413, 210/415, 770

See application file for complete search history.

(56) References Cited

U.S. PATENT DOCUMENTS

| | | | | | |
|---|---|---|---|---|---|
| 1,765,389 | A | * | 6/1930 | Wendler | 100/149 |
| 2,793,582 | A | * | 5/1957 | Rothe et al. | 99/443 C |
| 4,363,264 | A | * | 12/1982 | Lang et al. | 99/510 |
| 4,429,626 | A | * | 2/1984 | Ihara et al. | 99/510 |
| 5,055,027 | A | * | 10/1991 | Sato | 425/197 |
| 5,078,865 | A | * | 1/1992 | Huber | 210/162 |
| 5,476,550 | A | * | 12/1995 | Walker | 127/2 |
| 5,567,463 | A | * | 10/1996 | Schaaf | 426/523 |
| 5,770,094 | A | * | 6/1998 | Garton et al. | 210/791 |
| 5,857,405 | A | * | 1/1999 | Bischof | 100/37 |
| 6,096,201 | A | * | 8/2000 | Bruke | 210/155 |

* cited by examiner

*Primary Examiner*—Derris H. Banks
*Assistant Examiner*—Jimmy T. Nguyen
(74) *Attorney, Agent, or Firm*—Sughrue Mion, PLLC

(57) ABSTRACT

A system for transporting and dewatering solids in a fluid system. An auger is used to transport solids and provide first stage compaction. A dewatering plate having a restricted opening provides second stage compaction and dewatering. The auger maybe be shafted or shaftless. First stage compaction is achieved by a change in helical pitch of the auger immediately preceding the location of the dewatering plate.

14 Claims, 4 Drawing Sheets

AUGER DEWATERING SYSTEM

BACKGROUND OF THE INVENTION

1. Field of the Invention

This invention relates to the treatment of waste materials and in particular, the compaction of solids by removing water.

2. Prior Art

The use of augers as a means of transporting material in a conveyor like manner is well known and established in a variety of different configurations.

U.S. Pat. Nos. 1,906,395 and 5,000,307 are representative. Additionally, implementation of auger lift systems for handling waste material during the treatment of sewage is well known and established. The JWCE Auger Monster™ series provides a modular headworks system where the auger is placed immediately downstream of a grinding unit to convey ground coarse solids out of the fluid stream for disposal in landfills and the like. In general, such auger systems are used to lift solids from a collection point in the fluid stream to a discharge point for removal from the system.

Given the inherent compaction that results by using a helical member, solid material is compacted to some degree while waste water entrained within the solids is separated, drained from the system and returned to the waste water stream. The dewatered coarse solids are preferred for disposal since the water content is reduced. These techniques thus essentially use the auger as a means to move, generally lift the sludge from one location to a higher, second location for removal while compaction is a secondary function, performed inherently by the auger.

Within such systems, the water content is significant and adds excess weight to the solid material that is to be removed. Consequently, there is a standing requirement to dewater, that is remove excess water from the system while still providing for the removal of solid material in a compacted form.

In such systems, while the auger provides a degree of compaction, if the solid material becomes excessively dense, that is compacted too much, then friction between the solid material mass entrained within the auger and the inside of the casing becomes to great, resulting in binding. The potential results include damage to the auger and/or burning out the drive motor. Conversely, if the extent of compaction of the solid material is insufficient, then unnecessary water is carried along through the system resulting in decreased efficiency, higher cost for solid disposal and the like.

SUMMARY OF THE INVENTION

It is therefore an object of this invention to provide for an improved dewatering auger system that overcomes the disadvantages of the prior art.

It is a specific of this invention to provide an improved auger system that increases the residual weight of dry solids by effectively removing water from the system.

These and other objects of this invention, are fulfilled by means of a unique augering system that employs the use of a compacting dewatering section whereby solid materials are compacted without placing undo stress on the system, without unnecessarily creating friction in the auger section and yet allowing the discharge for large blocks of material.

These aspects of the invention will be described in greater detail by reference to the drawing and the description of the preferred embodiment that follows.

DESCRIPTION OF THE PREFERRED EMBODIMENT

Figure 1:
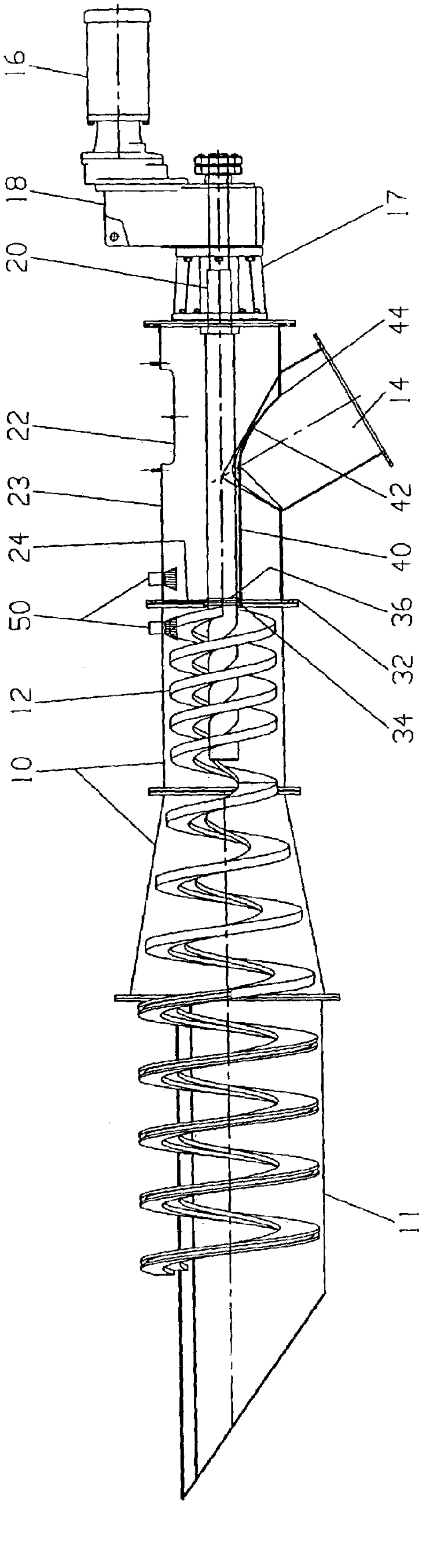
FIG. 1 is a schematic view of the essential components of this invention.

Referring now to FIG. 1, the basic elements to the system are depicted. An outer casing 10 provides the housing for the system to confine solids during the lifting and compaction operation. While shown as a housing for a portion of auger 12, it will be appreciated that this casing extends the substantial run of the auger for purposes of providing the conduit for the transportation of solids. A portion 11 of the casing typically has a screen section that extends into the fluid stream serving both as a drain for water that is separated as well as a conduit for waste water in the stream to flow through. Also, while shown in a horizontal position for purposes of explanation, typically, the casing 10, 11 is inclined in an angle of approximately 35–45° relative to the ground. An inlet section, not illustrated, has an input opening in which solids are accumulated. This is typically immediately downstream of a grinder unit, with the inlet located at or near the bottom of the stream. Coarse solids tend to accumulate and are carried by the waste water stream into the auger section. Then, by rotation of the auger 12, those materials are moved to an outlet or discharge port 14, typically located above the stream. The discharged compacted solids are then transported for further processing or use at landfills for incineration, for composting, or for other means of disposal.

The auger 12 is driven by a motor 16 having an appropriate gear section 18 coupled to the auger shaft 20. As illustrated, the casing 23 has an end plate bolted to a transition section 17 which in turn is coupled to the housing for the gear section 18. Casing 23 has an access port 22 to provide for cleaning and other maintenance operations. As will be described herein, the casing 23 and the discharge port 14 are separated, and in accordance with this invention, a dewatering plate 24 is used that provides for further compaction of solids.

Figure 2:
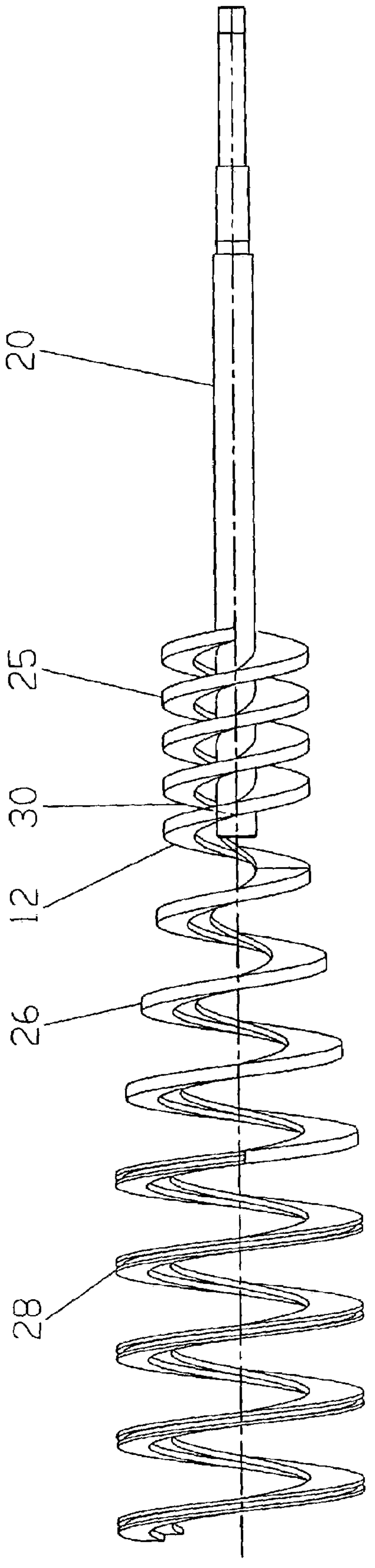
FIG. 2 is a depiction of the auger used in accordance with this invention.

Referring now to FIG. 2, the aspects of the auger 12 are illustrated in somewhat greater detail. The auger has a shaft 20 and a shafted section of fairly sharp radius edge helixes 25. This is the primary compaction and dewatering section of the auger. The shaft 20 provides increased support for the auger during that portion of its run in which significant compaction occurs. As illustrated, the remainder of the auger is shaftless. Auger has three sections, a compaction section, a transition and a lifting portion. The transition section 26 of the auger is one in which both pitch and diameter increase until the helix matches pitch and diameter of the lifting section 28. The lifting section 28 extends into the fluid stream for purposes of transporting entrained material for eventual compaction and removal of water.

While the helix configuration as illustrated in FIG. 2 is preferred, the helix can also be of a constant diameter spiral and, depending on a mode of utilization; the shaft 20 could extend a greater distance for purposes for providing additional support. Moreover, while not illustrated, the shaft can be a multi-piece assembly joined by shaft sections to facilitate removal. As will be apparent to those of skill in this technology, the pitch of the helix is a function of the mode of utilization such as lifting distance, type of material being handled and intending speed of operation.

As illustrated in FIG. 2, the transition section 26 of the helix employs a section 30 which is diametrically offset at an angle relative to that of the main spiral in the dewatering section 25. The purpose of offsetting the spiral is to apply increased pressure to solids entering the dewatering section and, at the same time, minimize any wobble which may occur as the solids impact at the end of the shaft 20.

Referring back to FIG. 1, the outlet 14 is shown disposed at an angle relative to the dewatering and compaction section of the casing. This portion of the system contains a casing 23 with an access port 22. It is bounded by the dewatering plate 24 on the input side and a mounting flange 15 coupling the casing to the transition section 17. The shaft 20 extends through this portion of the system but there is no helical portion of the auger. Compacted material is guided along the lower portion to the outlet 14 by means of a guide plate 40. This allows for the efficient exit of compacted material without contact with the shaft or accumulation within the system.

Primary compaction occurs within auger section 25. Water which is separated out flows downward into the screen section 11 and hence back into the fluid stream. While compaction efficiency of the auger is generally acceptable, water remains in the solids. If too much compaction occurs, friction builds up and the system can bind with damage occurring. Hence, another mechanism is used to further dewater the solids that does not rely on auger compaction.

Figure 3:
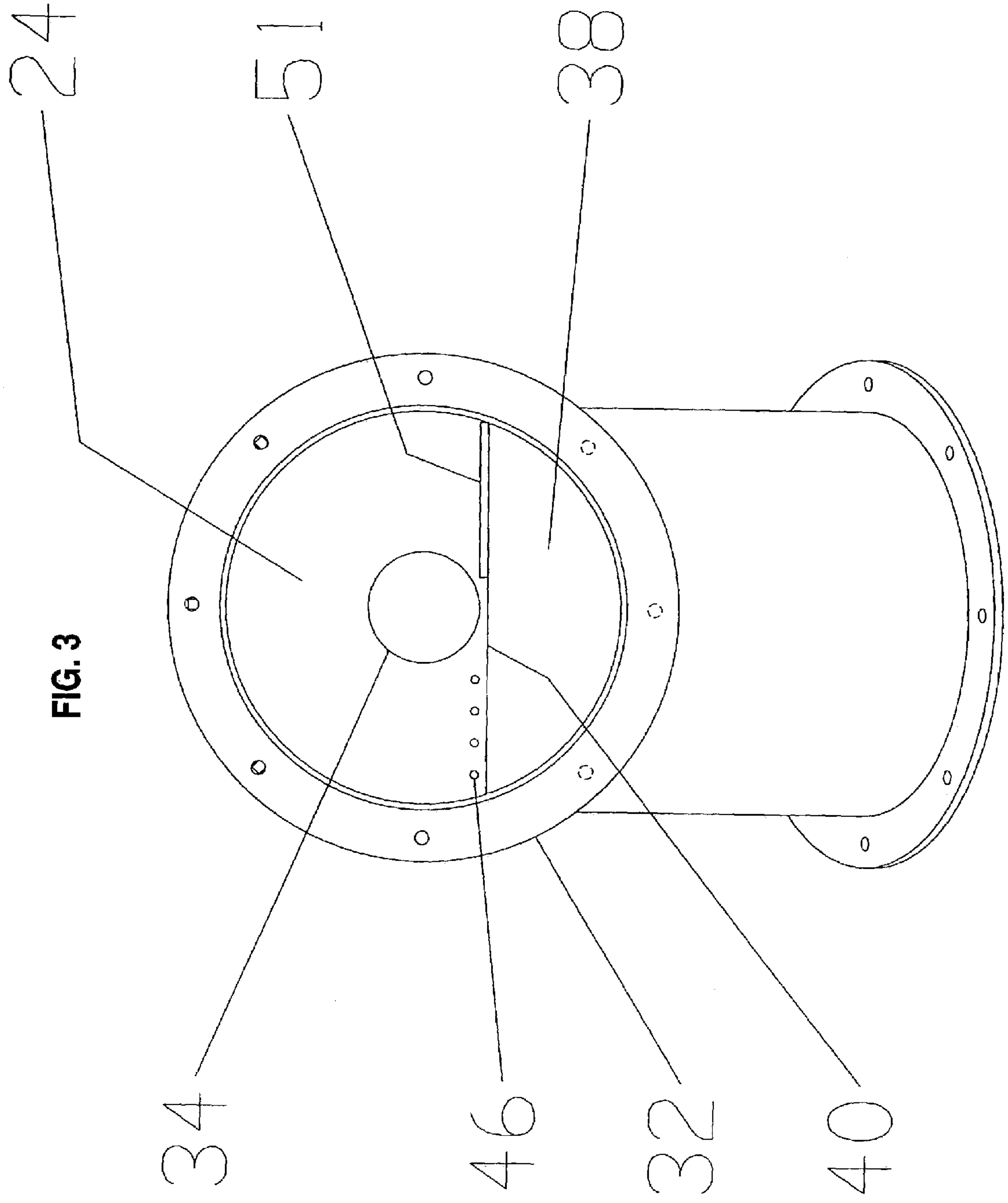
FIG. 3 is a front view of the compaction plate in accordance with this invention.
Figure 4:
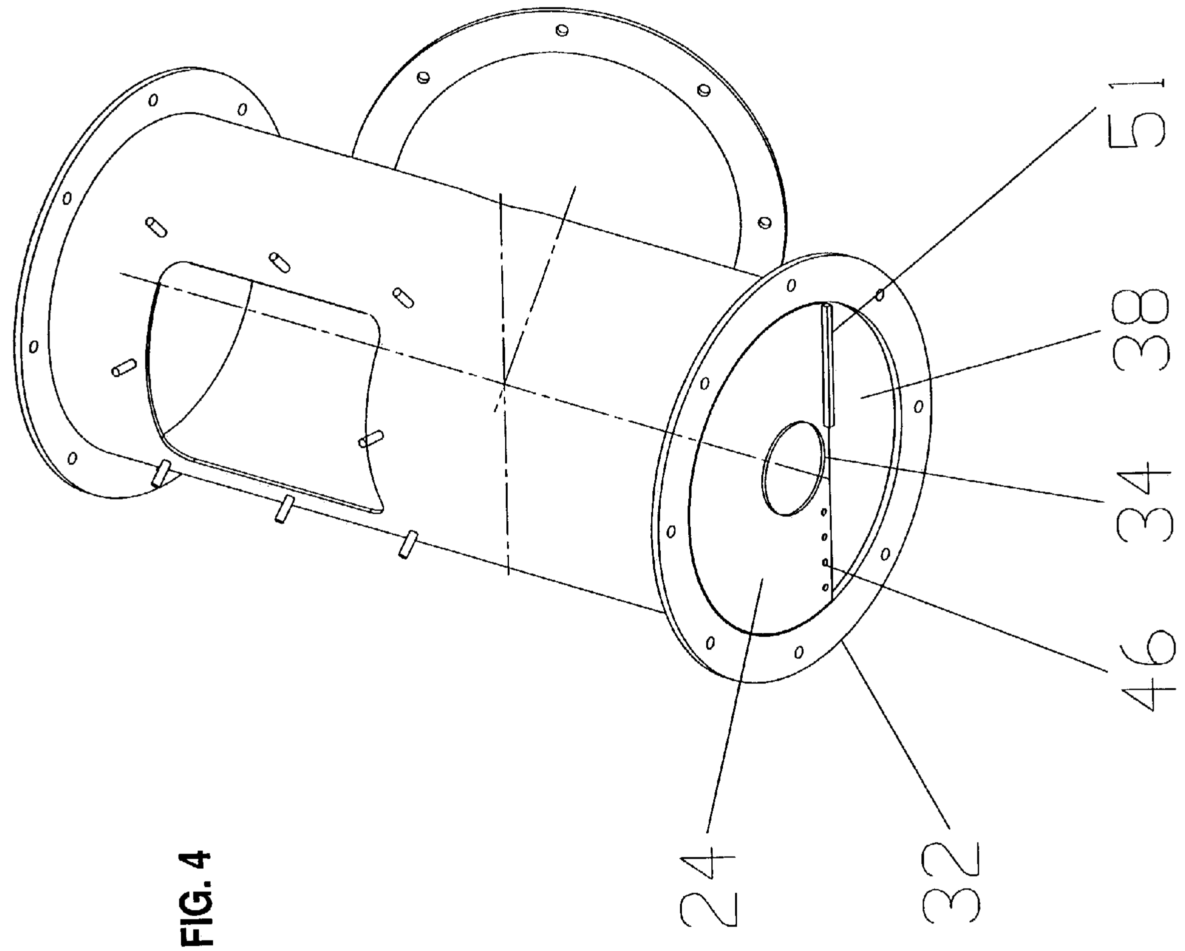
FIG. 4 is an isometric view of the compaction plate in accordance with this invention.

A specific dewatering section is employed between the auger compaction portion and the exit. It uses a plate 24 that blocks a portion of the solids thus further compacting it and removing additional water. This dewatering plate is illustrated in FIGS. 3 and 4. The plate 24 is welded to the casing by means of a flange 32 on the end of the casing. A series of bolt holes are disposed about the periphery of the plate aligned with those on the flange 32 to provide for affixation. A central bore 34 is provided to allow the shaft 20 to pass through the plate. A series of shaft seals 36 are positioned circumferentially about the shaft on the plate to prevent debris and other material from passing through this opening while, at the same time, allowing the shaft to rotate. A scraper 51 at the corner of the vertical dewatering plate 24 and the horizontal dewatering plate 40 is provided to scrape away any material that may adhere to the tip of the spiral 12 and 25. The scraper ensures that the material is directed into the opening 38 and that the material does not wrap around the shaft 20.

The dewatering plate 24 has an opening 38 to provide a path with a discharge of solids, (see FIG. 4). The top of the discharge opening 38 is in the form of a flat plate 40, (see FIG. 1) which extends to the rear of the dewatering plate 24 and joins the outlet 14. A smooth transition surface 42 is provided in the interior of the outlet so that a smooth transition occurs for a material flow through the opening 38 in a compacted form and into the discharge port 14. The plate 42 serves to block off the remainder of the dewatering compartment 23 so that all compacted material is guided to the exit port 14. The plate 40 with the transition section 42 terminates in section 14 and has the additional function of providing additional resistance on the solid material to allow for further compaction as the direction of movement is varied. To prevent the accumulation of material at the transition, a static scraper 44 is provided having a sharp contour for the purpose of removing any material that may tend to adhere to the end of the transition plate 42.

As illustrated in FIG. 3, as series of holes 46 are located in the dewatering plate 24 to allow for seepage of any liquid that has passed through the seal 36 to be drained back into the transportation section of the system.

Additionally, spray wash nozzles 50 can be placed in the casing at appropriate locations for purposes for cleaning the auger or any components. As illustrated in FIG. 1 a first spray nozzle is located in the compaction section and a section placed in the dewatering casing 23.

In operation, the waste material requiring transportation and dewatering is conveyed upward by the auger section 28 inside of the casing. Compaction occurs to a certain extent as the material is lifted. Water then flows back down the interior of the casing 10 and into the waste water stream via screen section 11. It is important, however, that as compaction occurs, with the build up of friction within the system, that the compacted solids are effectively removed so that the system does not bind. The solid material then encounters the transition section 26, the compaction section 25, and ultimately the dewatering plate 24. The result then is further compaction of the solid materials in a two-fold manner. The first is by the decrease pitch of the helix which causes further compaction of the material that is entrained. The second stage of compaction occurs by the resistance of the dewatering plate 24 and in particular the solid upper section. The result then, is that solid material is forced through the opening 40 and into the discharge portion of the system exiting through the discharge chute 14. At the compaction section water which is separated out flows backward and into the waste water stream given the angular elevation of the entire system. The seal 36 prevents solids from entering the open compartment of the dewatering section. The seal is free floating, but does provide a tight fit around the shaft 20. Accordingly, affirmative action occurs not only by the action of the auger screw, but also by the resistance of the dewatering plate 24.

Depending on the type of materials to be dewatered and the overall loading on the system, a thrust bearing can be incorporated to handle the axial loads created by the dewatering section and thus reduce any additional stresses that are placed on the drive components such as the gear section 18 and the drive motor 16.

Additionally, while the dewatering plate 24 is shown as having an opening of a "crescent" shape, it is apparent that the opening could also be modified with fillets or the like so that there are no sharp corners, transitions and the like, which tend to provide points where solid material may accumulate. For example, the opening may be a completely rounded or oblong hole so that there are no sharp transitions or corners that would tend to break up the continuum of compacted solids passing through.

The spiral end 12 and 25 may be affixed with inserts for higher abrasion resistance.

The scraper 51 may be of different materials and shapes to provide varying amounts of abrasion resistance and scraping efficiency.

While this invention has been described relative to its preferred embodiment, it is apparent that other modifications can be facilitated consistent with this invention.

What is claimed is:

1. A system for transporting and dewatering solid matter comprising:

a housing, a helical auger located in said housing for transporting solid material from a fluid stream toward an outlet of said housing, and a drive for rotating said auger, and a dewatering plate disposed within said housing between said auger and said outlet, said dewatering plate defining a first opening for allowing said auger drive to pass through and a second opening that defines a flow restriction for solid material to compact and dewater said solid material, wherein said auger comprises a helical compaction zone positioned adjacent to said dewatering plate, a central shaft in said compaction zone, said shaft extending through said dewatering plate, and a lifting section having a helical pitch different from that of said compaction zone, said auger being shaftless in said lifting zone.

2. The system of claim 1 further comprising a guide plate extending from said dewatering plate to said outlet, said guide plate configured to direct solids passing through said second opening of said dewatering plate into said outlet.

3. The system of claim 2 further comprising a section of said guide plate terminating within said outlet.

4. The system of claim 1 wherein said outlet is oriented at an acute angle relative to said dewatering plate.

5. The system of claim 1 wherein said dewatering plate further comprises a series of water evacuation holes.

6. The system of claim 1 wherein said drive for said auger comprises a drive motor and reduction gear coupled to said auger.

7. The system of claim 1 further comprising a flange on said housing for mounting said dewatering plate, and said flange defining a portion of the second opening.

8. A system for transporting and dewatering solid matter comprising:

a housing;

a helical auger located in said housing for transporting solid material from a fluid stream toward an outlet of said housing, and a drive for rotating said auger, a dewatering plate disposed within said housing between said auger and said outlet, said dewatering plate defining a first opening for allowing said auger drive to pass through and a second opening that defines a flow restriction for solid material to compact and dewater the solid material, and a guide plate extending from said dewatering plate to said outlet and said guide plate positioned between said auger drive and said outlet, said guide plate configured to direct the solid material passing through said second opening of said dewatering plate into said outlet and to prevent the solid material from contacting said auger drive.

9. A system for transporting and dewatering solid matter in a fluid stream, said system comprising:

a housing, a helical auger located in said housing for transporting solid material from the fluid stream toward an outlet of said housing, and a drive for rotating said auger, a dewatering plate disposed within said housing between said auger and said outlet, said dewatering plate defining a first opening for allowing said auger drive to pass through and a second opening that defines a flow restriction for solid material to compact and dewater the solid material, wherein said housing is configured so that liquid is returned to the fluid stream via an open end of said housing opposite said outlet.

10. A system for transporting and dewatering solid matter in a fluid stream, said system comprising:

a housing, a helical auger located in said housing for transporting solid material from a fluid stream toward an outlet of said housing, and a drive for rotating said auger, a dewatering plate disposed within said housing between said auger and said outlet, said dewatering plate defining a first opening for allowing said auger drive to pass through and a second opening that defines a flow restriction for solid material to compact and dewater said solid material, wherein said housing comprises a casing that opens to the fluid stream in an axial direction of said helical auger to receive the solid material that is to be compacted and dewatered.

11. The system according to claim 10, wherein said helical auger is supported at only one of its ends.

12. The system according to claim 11, wherein the unsupported end of said helical auger is disposed within the opening of said casing where the solid material is introduced.

13. A system for transporting and dewatering solid matter comprising:

a housing, a helical auger located in said housing for transporting solid material from a fluid stream toward an outlet of said housing, and a drive for rotating said auger, a dewatering plate disposed within said housing between said auger and said outlet, said dewatering plate defining a first opening for allowing said auger drive to pass through and a second opening that defines a flow restriction for solid material to compact and dewater said solid material, wherein said housing comprises a casing that opens in an axial direction of said helical auger to receive the solid material that is to be compacted and dewatered, and wherein said helical auger is supported at only one of its ends.

14. The system according to claim 13, wherein the unsupported end of said helical auger is disposed within the opening of said casing where the solid material is introduced.

* * * * *